United States Patent
Wiener et al.

(10) Patent No.: US 11,529,860 B2
(45) Date of Patent: Dec. 20, 2022

(54) TRANSMISSION ARRANGEMENT FOR A MOTOR VEHICLE AND METHOD FOR OPERATING A HYBRID VEHICLE

(71) Applicant: AVL COMMERCIAL DRIVELINE & TRACTOR ENGINEERING, Steyr (AT)

(72) Inventors: Herbert Wiener, Wieselburg (AT); Christoph Schörghuber, St. Peter (AT)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 17/045,175

(22) PCT Filed: Apr. 3, 2019

(86) PCT No.: PCT/AT2019/060114
§ 371 (c)(1),
(2) Date: Oct. 4, 2020

(87) PCT Pub. No.: WO2019/191797
PCT Pub. Date: Oct. 10, 2019

(65) Prior Publication Data
US 2021/0146768 A1    May 20, 2021

(30) Foreign Application Priority Data
Apr. 4, 2018   (AT) .............................. A 50278/2018

(51) Int. Cl.
*B60K 6/365*        (2007.10)
*B60K 6/547*        (2007.10)
(Continued)

(52) U.S. Cl.
CPC .............. *B60K 6/365* (2013.01); *B60K 6/547* (2013.01); *B60K 17/28* (2013.01); *F16H 57/02* (2013.01);
(Continued)

(58) Field of Classification Search
None
See application file for complete search history.

(56) References Cited

U.S. PATENT DOCUMENTS

| 7,832,510 | B2 * | 11/2010 | Hoshiba | ................ | B60W 10/08 180/65.265 |
| 8,052,571 | B2 * | 11/2011 | Yamada | ................ | B60K 6/445 477/20 |
| 8,056,659 | B2 * | 11/2011 | Oba | ....................... | B60K 6/387 180/65.225 |
| 8,894,527 | B2 * | 11/2014 | Choi | ...................... | B60K 6/387 475/5 |

(Continued)

FOREIGN PATENT DOCUMENTS

| CN | 106828072 A | * 6/2017 | |
| DE | 102016218361 A1 | * 3/2018 | ............. B60K 17/12 |

(Continued)

*Primary Examiner* — Dirk Wright
(74) *Attorney, Agent, or Firm* — Dykema Gossett PLLC

(57) ABSTRACT

The invention relates to a transmission arrangement (10) for a hybrid vehicle, comprising a housing (11), a transmission input shaft (12) and at least one transmission output shaft (13), a first planetary transmission set (PG1) having a first sun gear (zs1), a first ring gear (zr1) and a first planet carrier (c1) for a first planetary gear set (zp1) meshing with the first sun gear (zs1) and the first ring gear (zr1), also comprising a second planetary transmission set (PG2) having a second sun gear (zs2), a second ring gear (zr2) and a second planet carrier (c2) for second planetary gear set (zp2) meshing with the second sun gear (zs2) and the second ring gear (zr2), wherein the transmission input shaft (12) is rotationally fixed to the first planet carrier (c1), and the first ring gear (zr1) and the second ring gear (zr2) are permanently connected to one another and are rotationally fixed to the transmission output shaft (13), further comprising a first electric machine (E1) and a second electric machine (E2), wherein the first electric machine (E1) is in permanent (Continued)

driving engagement with first sun gear ($zs1$) and the second electric machine ($E2$) is in driving engagement with the second sun gear ($zs2$) in at least one operating mode, and wherein the first sun gear ($zs1$) can be connected to the housing (11) via a first switching element (S1). According to the invention, the second planet carrier ($c2$) is fixedly connected to the housing (11) and the second electric machine (E2) is drivingly engaged or can be drivingly engaged to the second sun gear ($zs2$).

19 Claims, 8 Drawing Sheets

(51) Int. Cl.
*B60K 17/28* (2006.01)
*F16H 57/02* (2012.01)
*B60K 6/48* (2007.10)

(52) U.S. Cl.
CPC ........ *B60K 6/48* (2013.01); *F16H 2200/2007* (2013.01); *F16H 2200/2038* (2013.01)

(56) References Cited

U.S. PATENT DOCUMENTS

| | | | |
|---|---|---|---|
| 9,139,079 B2* | 9/2015 | Suntharalingam | B60K 6/387 |
| 9,452,673 B2* | 9/2016 | Kim | F16H 57/043 |
| 9,657,460 B2* | 5/2017 | Naito | F16H 57/02 |
| 9,701,187 B2* | 7/2017 | Smetana | B60K 6/48 |
| 9,744,839 B2* | 8/2017 | Kim | B60K 6/445 |
| 9,764,630 B2* | 9/2017 | Kaltenbach | B60K 6/48 |
| 9,783,039 B2* | 10/2017 | Hwang | B60K 6/365 |
| 9,840,140 B1 | 12/2017 | Holmes et al. | |
| 9,902,393 B2* | 2/2018 | Endo | B60W 50/082 |
| 9,994,102 B2* | 6/2018 | Simon | B60K 25/06 |
| 2008/0191568 A1* | 8/2008 | Kobayashi | B60W 10/02 |
| | | | 310/83 |
| 2010/0044128 A1 | 2/2010 | Hidehiro et al. | |
| 2014/0162823 A1 | 6/2014 | Choi et al. | |
| 2015/0105201 A1 | 4/2015 | Park | |
| 2017/0066436 A1 | 3/2017 | Takahito et al. | |

FOREIGN PATENT DOCUMENTS

| | | |
|---|---|---|
| JP | 2009120043 A | 6/2009 |
| JP | 2014211213 A | 11/2014 |

* cited by examiner

TRANSMISSION ARRANGEMENT FOR A MOTOR VEHICLE AND METHOD FOR OPERATING A HYBRID VEHICLE

CROSS-REFERENCE TO RELATED APPLICATIONS

This application is a national stage filing based upon International application No. PCT/AT2019/060114, filed 3 Apr. 2019, which claims the benefit of priority to Austria application No. A 50278/2018, filed 4 Apr. 2018.

BACKGROUND

The invention relates to a transmission arrangement for a hybrid vehicle, comprising a housing, a transmission input shaft and at least one transmission output shaft, a first planetary transmission set having a first sun gear, a first ring gear and a first planet carrier for a first planetary gear set meshing with the first sun gear and the first ring gear, a second planetary gear set having a second sun gear, a second ring gear and a second planet carrier for a second planetary gear set meshing with the second sun gear and the second ring gear, wherein the transmission input shaft is rotationally fixed to the first planet carrier and the first and second ring gear are permanently connected to each other and are rotationally fixed to the transmission output shaft, further comprising a first electric machine and a second electric machine, wherein the first electric machine is in permanent driving engagement with the first sun gear and the second electric machine is driving engagement with the second sun gear in at least one operating mode, and wherein the first sun gear can be connected to the housing via a first switching element.

Furthermore, the invention relates to a method for operating a hybrid vehicle with a transmission arrangement of the aforementioned type.

From DE 10 2013 113 344 A1 a power transmission system for a hybrid electric vehicle having a first and a second planetary transmission set is known, one of which is designed as a minus gear and the other as a plus gear. A first electric machine and a second electric machine are arranged coaxially to the transmission input shaft, wherein the first electric machine is firmly connected to the sun gear of the first planetary transmission set and the second electric machine is firmly connected to the sun gear of the second planetary transmission set. The planet carriers of the two planetary transmission sets can be rotatably connected to each other via a friction clutch. The sun gear of the first planetary transmission set can be held by a first friction brake and the planet carrier of the second planetary transmission set by a second friction brake.

DE 10 2013 226 472 A1 describes a power transmission system for a hybrid vehicle with a first planetary gear set and a second planetary gear set. The planet carrier of the first planetary gear set is connected to the output shaft of an internal combustion engine. The ring gears of the two planetary gear sets are interconnected and act on a drive unit. The planet carrier of the second planetary gear set can be held by a brake. The planet carrier of the first planetary gear set can be connected to the ring gears via a coupling. Furthermore, the sun gear of the first planetary gear set is connected to a first electric machine and the sun gear of the second planetary gear set is connected to a second electric machine.

SUMMARY OF THE INVENTION

Based on a transmission arrangement of the type mentioned at the beginning, it is the object of the invention to achieve high functionality with many operating modes in the simplest possible way and while taking up little installation space.

According to the invention, this is achieved in that the second planet carrier is firmly connected to the housing and in that the second electric machine—preferably via at least one transmission stage—is drive-connected or drive-connectable to the second sun gear.

Preferably, it is provided that the second electric machine can be drive-connected to the second sun gear via a second switching element—preferably selectively via a first or second transmission stage.

In a constructionally simple and compact embodiment of the invention, it is provided that both the first and second planetary gear sets are designed as simple minus transmissions.

In order to enable a so-called "Limp home" function in the event of failure of, for example, the control system for the electric machines, it is particularly advantageous if, in at least one emergency mode of the transmission arrangement, the transmission input shaft can be drive-connected to the first sun gear or the second sun gear via an emergency switching element. In order to enable continued operation with reduced functionality in the event of a malfunction, the transmission input shaft is drive-connected to the first sun gear or the second sun gear in emergency mode.

In an alternative embodiment variant of the invention, it is provided that in an emergency mode of the transmission arrangement, the transmission input shaft is drive-connectable via an emergency switching element to the second sun gear, either in addition to the connection to the planet carrier, optionally via a first forward transmission stage or via a reverse transmission stage—which reverses the direction of rotation—to the second sun gear.

A very space-saving design is possible if the transmission output shaft is arranged coaxially to the transmission input shaft.

An embodiment variant of the invention provides that the first electric machine and the second electric machine are arranged axially offset and parallel to each other, preferably also axially offset with respect to the transmission input shaft and/or transmission output shaft. This allows an optimal use of the available installation space. By using compact electric machines with high speeds, the installed space can be reduced and costs saved. The electric machines can, for example, be provided in the area of one front side of the transmission arrangement, thus making optimum use of the available space and enabling short arrangements to be realized. A further advantage is the easier assembly.

In another embodiment variant, it is provided that the transmission input shaft—preferably via a transmission stage—is drive-connected or drive-connectable to a power take-off shaft. This makes it possible to drive additional units or external machines if necessary.

In further embodiment variants, it is provided that a power take-off shaft is drive-connected or drive-connectable to the transmission input shaft via a switching element—preferably via a transmission stage—or is drive-connected or drive-connectable to the second electric machine—preferably via a transmission stage. This makes it possible to drive additional units or external machines mechanically or electrically, if required.

The invention provides that in an overdrive mode of the hybrid vehicle, the first electric motor is blocked, wherein the first sun gear is connected to the housing via a first switching element. An overdrive mode is understood to be a smooth gear of the transmission arrangement which causes a reduction of the engine speed necessary for a certain speed. By enabling the overdrive mode, fuel consumption, emissions, noise level and engine load can be significantly reduced, especially when the hybrid vehicle is driving overland. To minimize losses, preferably in overdrive mode, the second electric machine is mechanically separated from the drive train via the second switching element.

BRIEF DESCRIPTION OF THE DRAWINGS

The invention is explained in more detail below using the non-restrictive exemplary embodiments shown in the drawings, which show schematically.

Parts with identical functions are marked with the same reference numerals in the embodiment variants.

DETAILED DESCRIPTION

Figure 1:
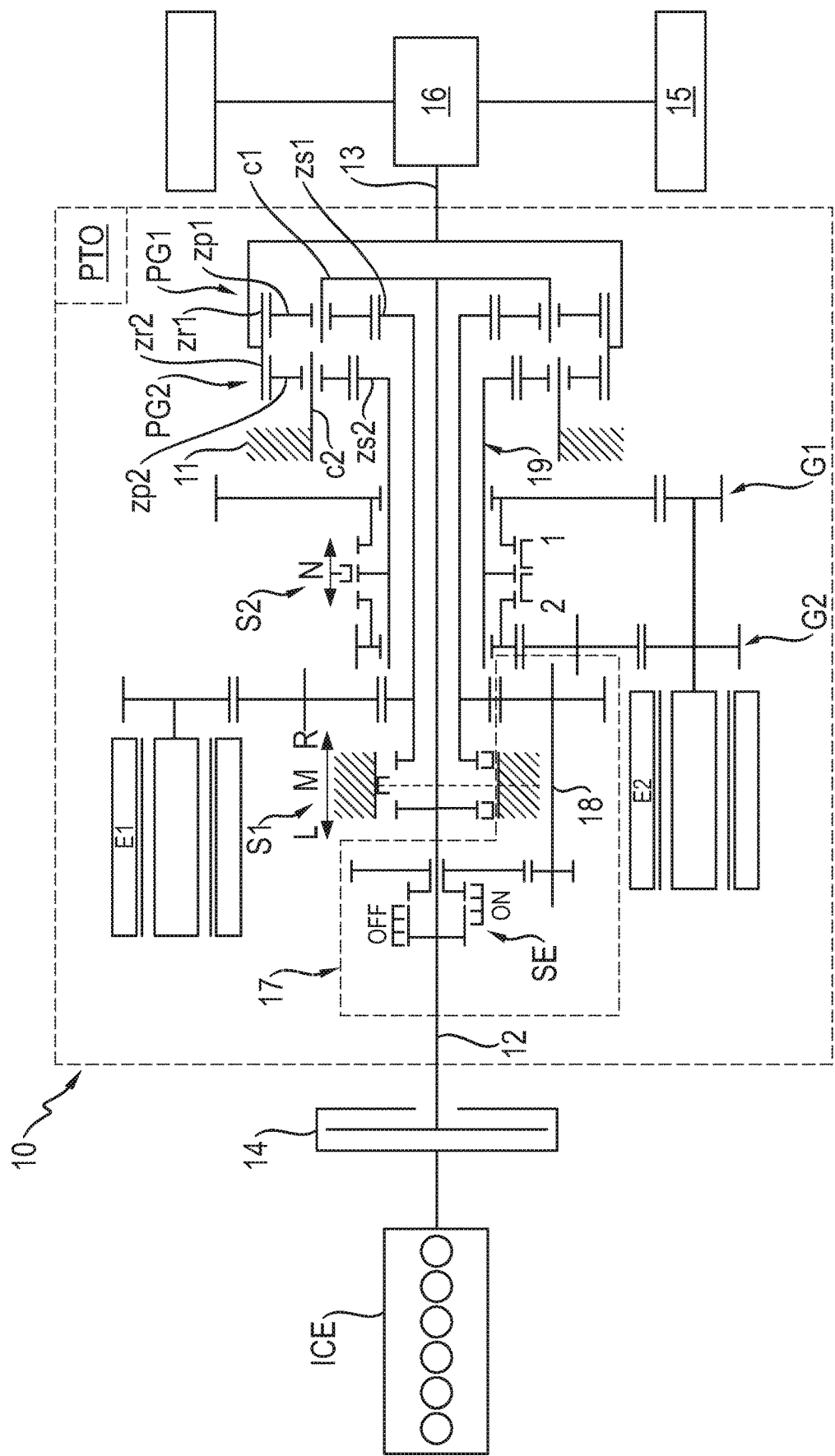
FIG. 1 a transmission arrangement in accordance with the invention in a first embodiment of the invention.

FIG. 1 to FIG. 8 each show transmission arrangements 10 for hybrid vehicles.

Each transmission arrangement 10 has a housing 11, a transmission input shaft 12 and at least one transmission output shaft 13. The transmission input shaft 12 can be connected to an internal combustion engine ICE via a clutch 14. The transmission output shaft 13 is used to drive the drive wheels 15 of the hybrid vehicle, wherein a differential is designated by reference numeral 16. A first planetary transmission set PG1 and a second planetary transmission set PG2 are arranged inside the housing 11, wherein the planetary transmission sets PG1, PG2 are designed as simple minus transmissions.

The first planetary transmission set PG1 has a first sun gear $zs1$, a first ring gear $zr1$ and a first planet carrier $c1$ for a first planet gear set $zp1$ meshing with the first sun gear $zs1$ and the first ring gear $zr1$. The second planetary transmission set PG2 has a second sun gear $zs2$, a second ring gear $zr2$ and a second planet carrier $c2$ for a second planetary gear set $zp2$ meshing with the second sun gear $zs2$ and the second ring gear $zr2$. The two ring gears $zr1$, $zr2$ are rigidly connected to each other in several pieces or are made in one piece. The transmission input shaft 12 is connected to the first planet carrier $c1$ in a rotationally fixed manner. The first ring gear $zr1$ and the second ring gear $zr2$ are permanently connected to each other and to the transmission output shaft 13 in a rotationally fixed manner. A first electric machine E1 and a second electric machine E2 are arranged in the housing 11, wherein the first electric machine E1 is permanently drive-connected to the first sun gear $zs1$ and the second electric machine E2 is drive-connected to the second sun gear $zs2$ in at least one operating mode of the transmission arrangement 10. The second planet carrier $c2$ is connected to the housing 11.

The first sun gear $zs1$ can be connected to housing 11 via a first switching element S1.

The second electric machine E2 is drive-connected to the second sun gear $zs2$ or in some embodiment variants can be drive-connected to the second sun gear $zs2$ via a second switching element S2.

Figure 2:
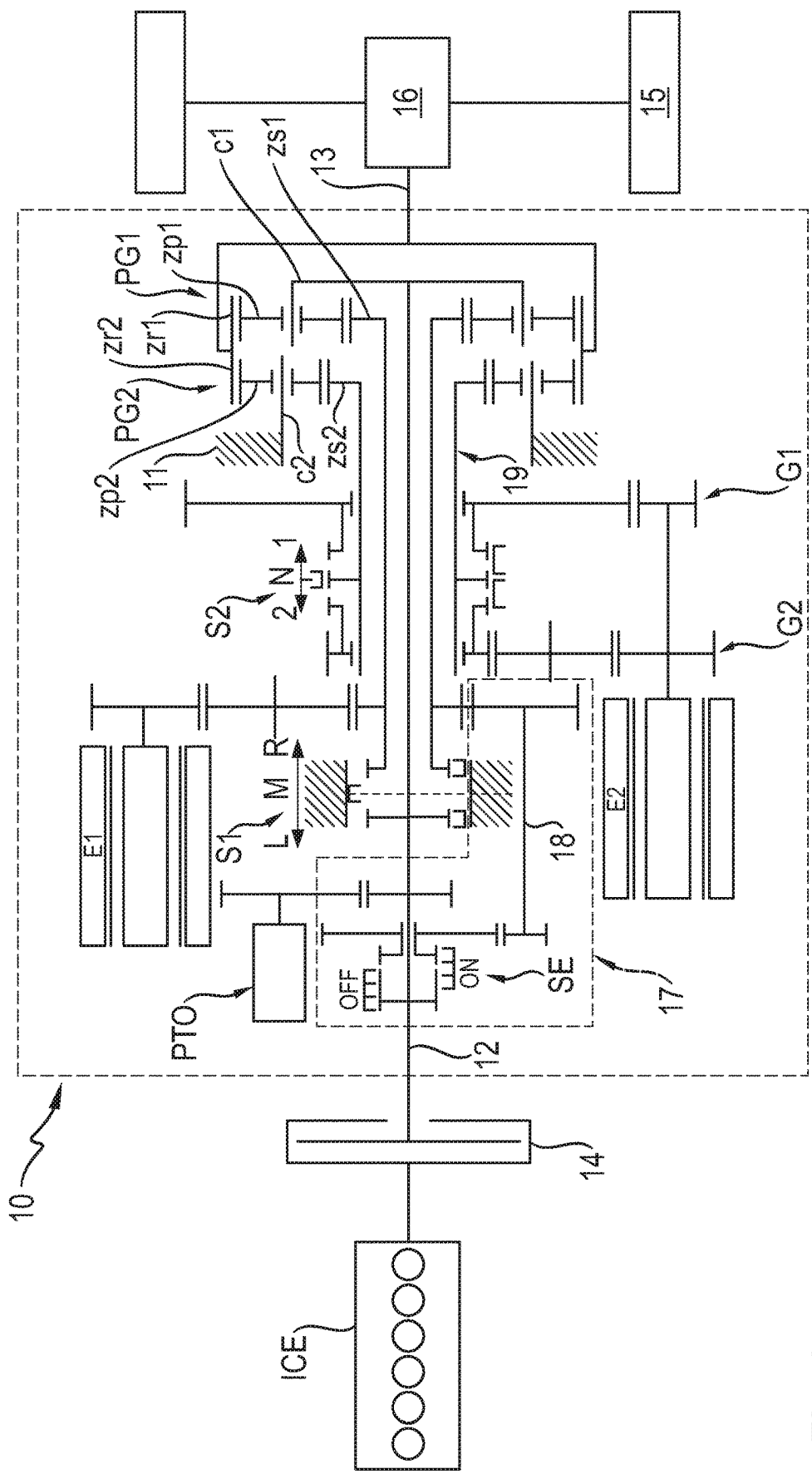
FIG. 2 a transmission arrangement in accordance with the invention in a second embodiment of the invention.
Figure 7:
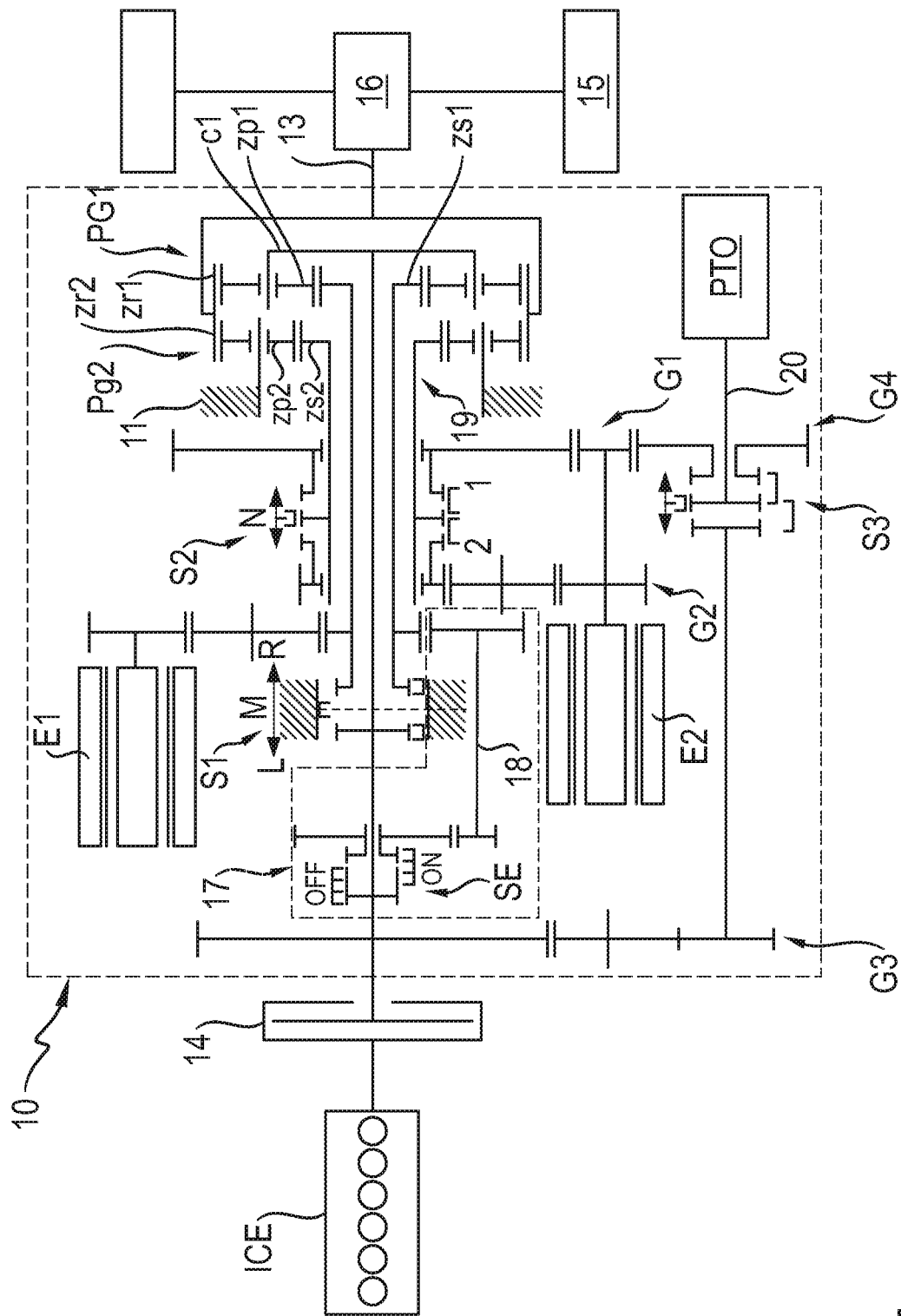
FIG. 7 a transmission arrangement in a seventh embodiment of the invention according to the invention.

Furthermore, the transmission arrangements 10 shown in FIG. 1, FIG. 2 and FIG. 7 each have an emergency device 17 with an emergency switching element SE, via which the transmission input shaft 12 can be drive-connected via an intermediate shaft 18 to the first planet carrier $c1$ and to the first sun gear $zs1$ simultaneously to realize a "Limp Home" function.

Furthermore, the transmission arrangements 10 shown in FIG. 3 to FIG. 6 each have an emergency device 17 with an emergency switching element SE, via which the transmission input shaft 12 can only be drive-connected to the second sun gear $zs2$ via an intermediate shaft 18 to realize a "Limp Home" function.

Figure 8:
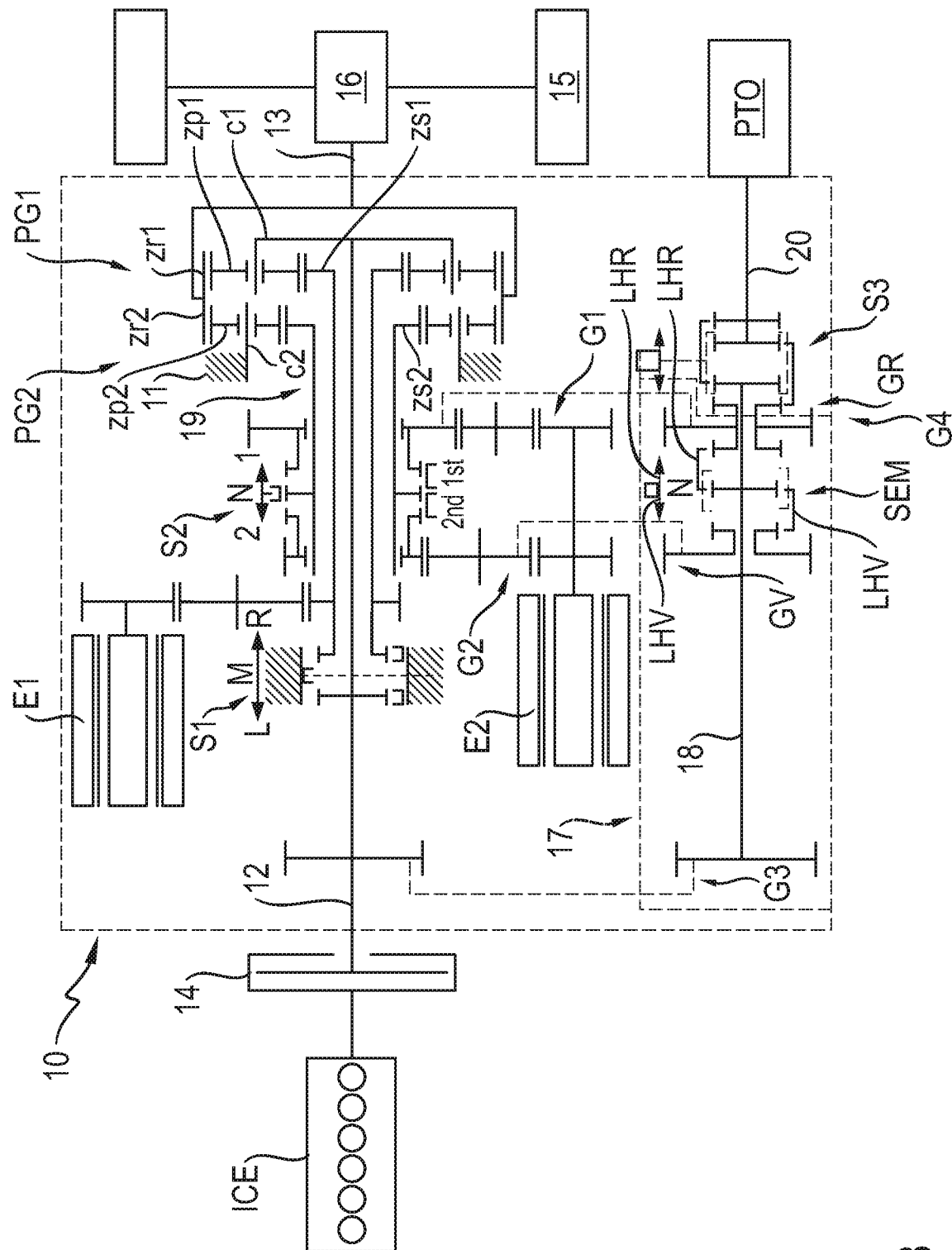
FIG. 8 a gear arrangement in accordance with the invention in an eighth embodiment of the invention.

Furthermore, the transmission arrangement 10 shown in FIG. 8 comprises an emergency device 17 with an emergency switching element SEM, via which the transmission input shaft 12 can be drive-connected for realizing a "Limp Home" function via an intermediate shaft 18 simultaneously to the first planet carrier $c1$ and optionally via a forward transmission stage GV—for Limp Home Forward—to the second sun gear $zs2$ or optionally via a reverse transmission stage GR—which reverses the direction of rotation for Limp Home Reverse—to the second sun gear $zs2$.

In the embodiment variants shown in FIG. 1, FIG. 2, FIG. 3, FIG. 5, FIG. 7 and FIG. 8, the first respective switching element S1 has three switching positions, namely L, M and R, wherein the transmission input shaft 12 is blocked in the left switching position and the first sun gear $zs1$ is locked in the right switching position. In the middle position M neither the transmission input shaft 12 nor the first sun gear $zs1$ are braked and can rotate freely.

Furthermore, in FIG. 1, FIG. 2, FIG. 3, FIG. 4, FIG. 7 and FIG. 8 second switching elements S2 are provided, which also have three switching positions, namely 1, 2 and N, wherein in the first switching position 1 the second machine is drive-connected to the second sun gear $zs2$ via a first transmission stage G1 and in the second switching position 2 via a second transmission stage G2.

Furthermore, the embodiment variants according to FIG. 1, FIG. 2 and FIG. 7 include an emergency device 17 with an emergency switching element SE, with which the input shaft 12 can be drive-connected to the first sun gear $zs1$ in addition to the connection to the planet carrier $c1$ via the intermediate shaft 18. The emergency switching element SE has two switching positions, namely "OFF" and "ON", wherein in the switching position "OFF" the "Limp Home" function is deactivated and the direct connection between the transmission input shaft 12 and the first sun gear $zs1$ is interrupted. By moving the emergency switching element SE, the drive connection between the transmission input shaft 12 is established simultaneously with the first planet carrier $c1$ and the first sun gear $zs1$, thus activating the "Limp Home" function. The "Limp Home" function is activated, for example, in the event of a failure of the control system for the electric machines E1, E2, allowing the vehicle to continue driving with limited functionality.

Figure 3:
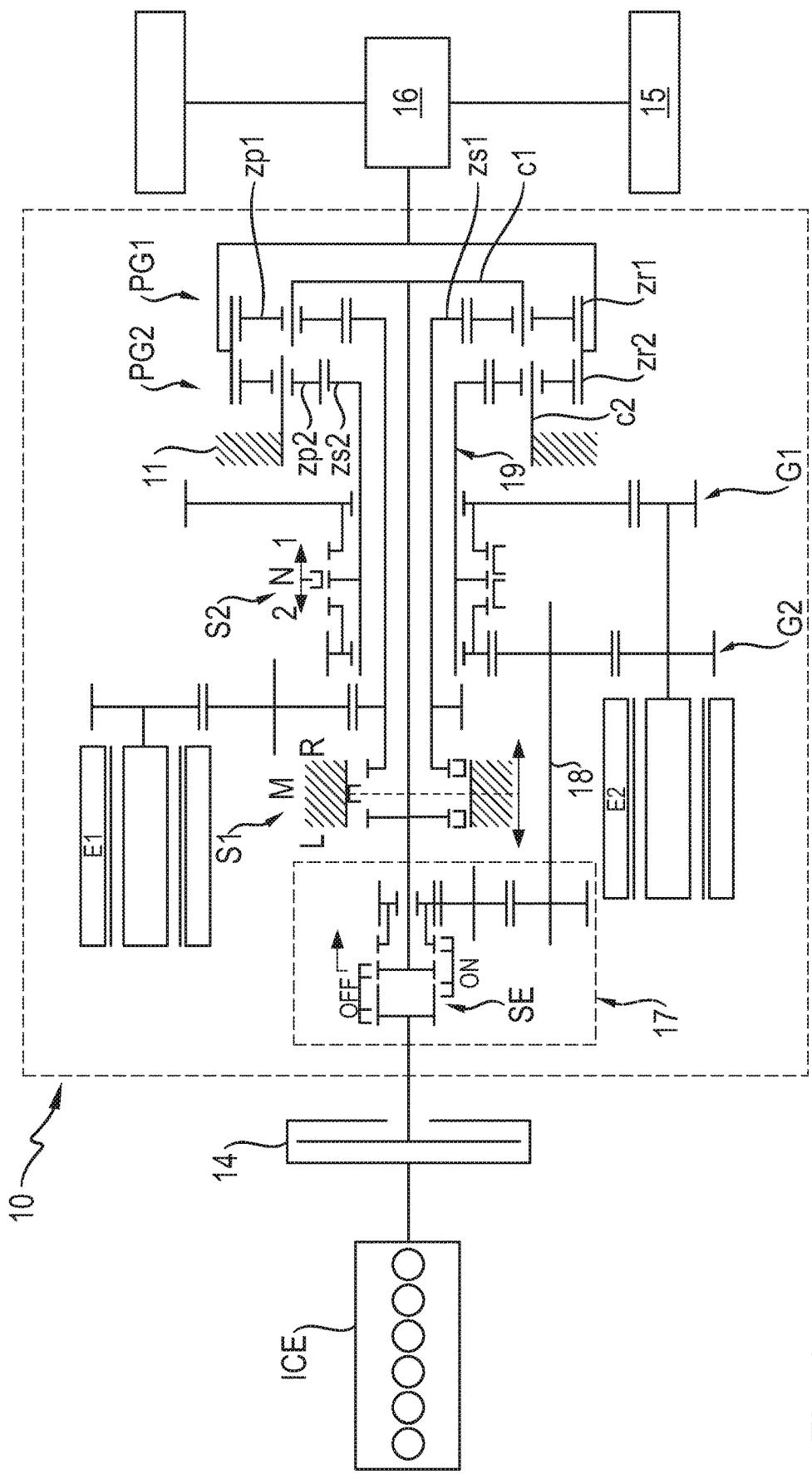
FIG. 3 a transmission arrangement in accordance with the invention in a third embodiment of the invention.
Figure 4:
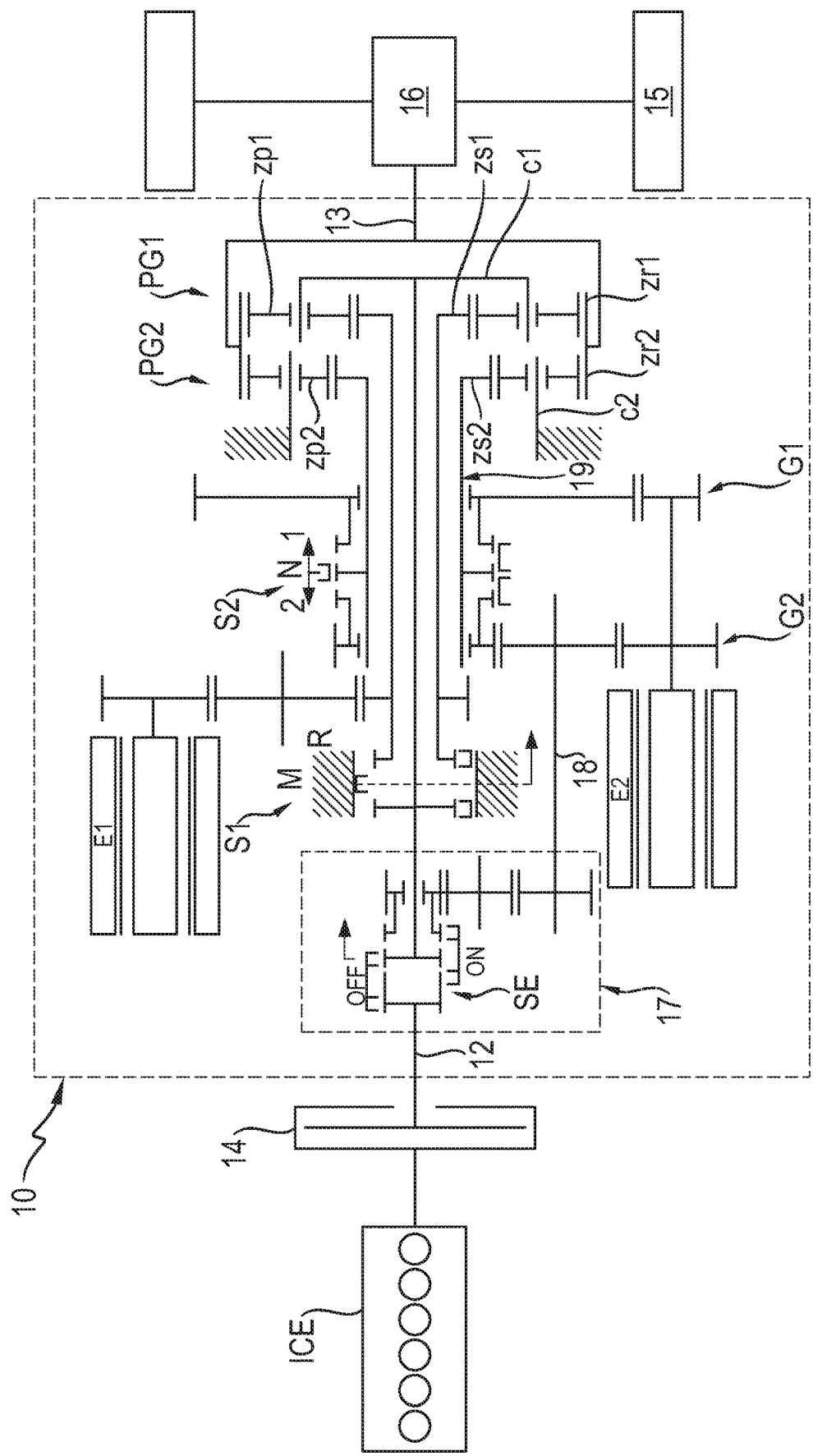
FIG. 4 a transmission arrangement in accordance with the invention in a fourth embodiment of the invention.
Figure 5:
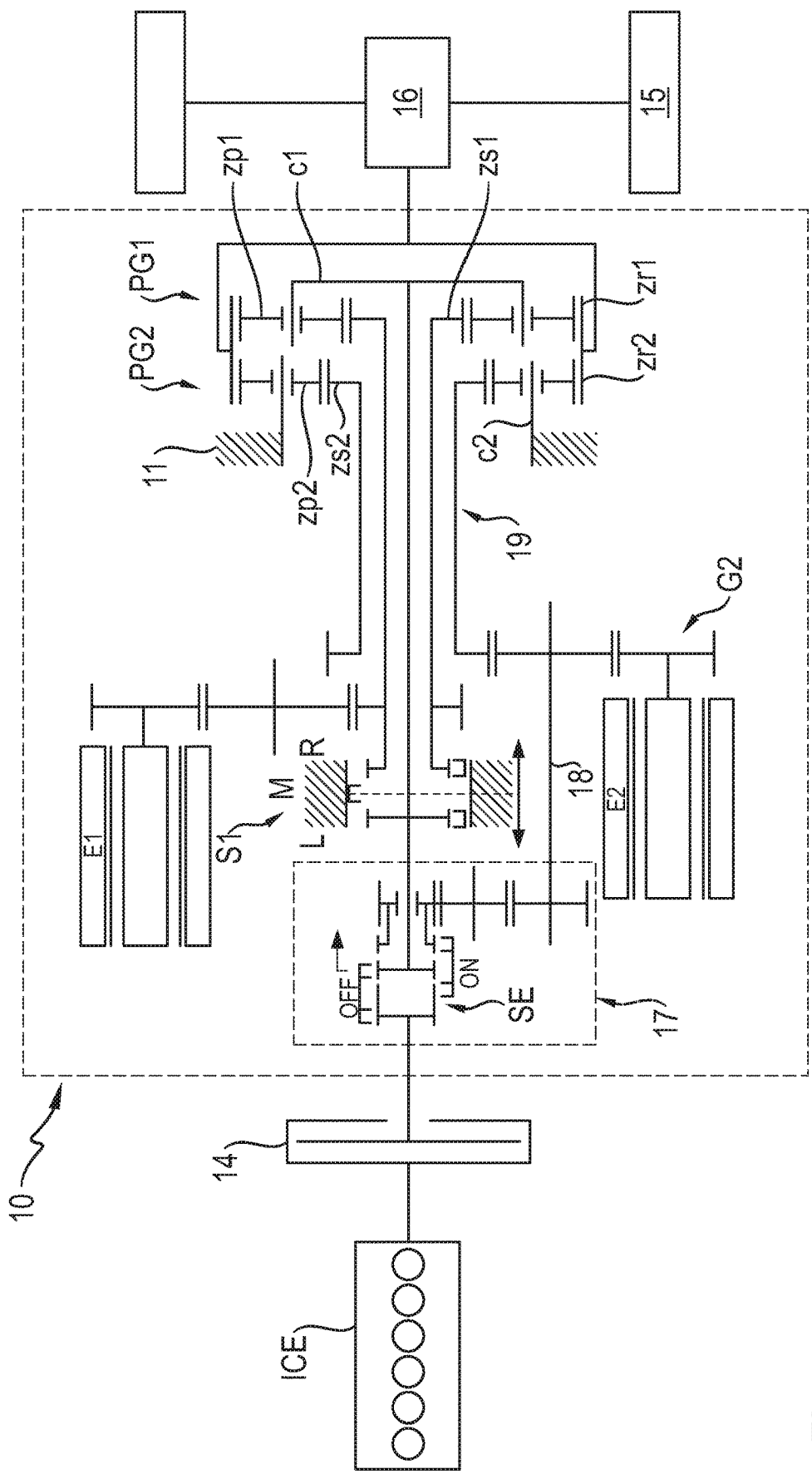
FIG. 5 a transmission arrangement according to the invention in a fifth embodiment of the invention.

FIG. 3 to FIG. 6 show transmission arrangements 10 according to the invention, which differ from the exemplary embodiments shown in FIG. 1, FIG. 2 and FIG. 7 in that the emergency switching element SE allows the transmission input shaft 12 to be connected via the intermediate shaft 18 not to the first sun gear zs1 but to the second sun gear zs2. In FIG. 3 and FIG. 4, the second switching element S2 must additionally be switched to switching position "1" or switching position "2" to enable the "Limp Home" function. In the simpler embodiment versions of FIG. 5 and FIG. 6, the intermediate shaft 18 and the second electric machine E2 are directly connected to the second sun gear zs2—a second switching element S2 for selecting between transmission stages G1, G2 is not provided.

FIG. 8 shows a further transmission arrangement 10 according to the invention, which differs from the exemplary embodiments shown in FIG. 1 to FIG. 7 in that by means of the emergency switching element SEM the transmission input shaft 12 is simultaneously connected to the first planet carrier c1 and via the intermediate shaft 18 optionally via the forward transmission stage GV—for Limp Home Forward (position LHV of the emergency switching element SEM)—can be drive-connected to the second sun gear zs2 or optionally drive-connected to the second sun gear zs2 via a reverse gear stage GR—which reverses the direction of rotation for Limp Home Reverse (position LHR of the emergency switch element SEM).

In FIG. 3, FIG. 4 and FIG. 8, the second switching element S2 must additionally be switched to switching position "1" or switching position "2" to enable the "Limp Home" function. In the simpler embodiment versions of FIG. 5 and FIG. 6, the intermediate shaft 18 and the second electric machine E2 are drive-connected to the second sun gear zs2—a second switching element S2 for selecting between transmission stages G1, G2 is not provided.

Figure 6:
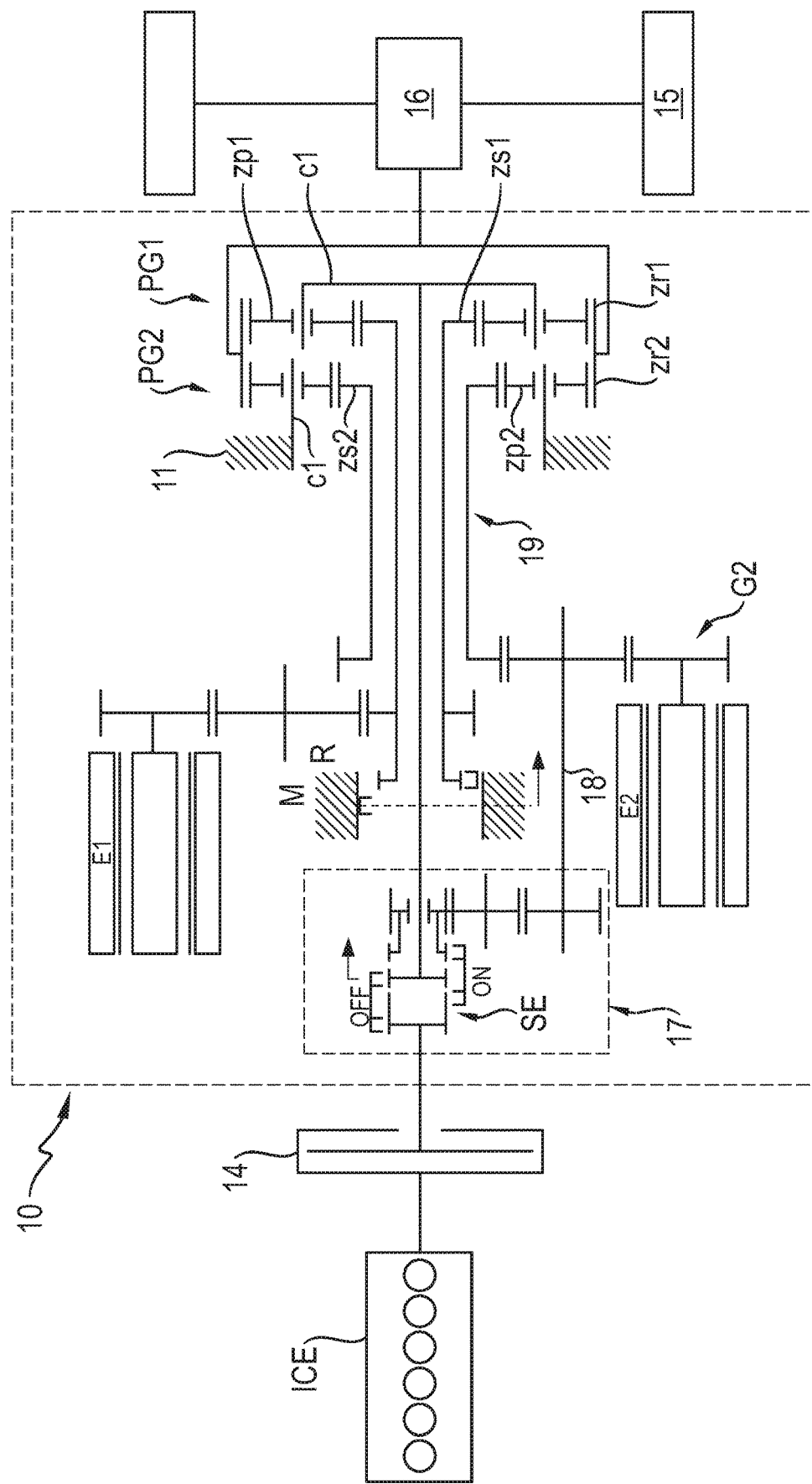
FIG. 6 a transmission arrangement according to the invention in a sixth embodiment of the invention.

FIG. 4 and FIG. 6 show further constructionally simple embodiment variants, in which the first switching element S1 has only two switching positions, namely the switching position "R", in which the first sun gear zs1 and the first electric machine E1 are blocked, and the switching position "M", in which the first sun gear zs1 and the first electric machine E1 are freely rotatable.

Furthermore, different variants for the realization of the power take-off PTO can be displayed independently of the embodiment variants. Preferably as in the case of the transmission arrangement 10 shown in FIG. 1, an electrically driven power take-off PTO can be installed as an option. Preferably, as with the second embodiment shown in FIG. 2, a mechanically driven PTO can be provided via the transmission input shaft 12.

Preferably, as with the embodiment variants shown in FIG. 7 and FIG. 8, in order to implement the power take-off PTO, the power take-off shaft 20 is drive-connected or drive-connectable to the transmission input shaft 12 via an additional switching element S3—preferably optionally via a transmission stage G3—or preferably optionally via a transmission ratio G4 to the second electric machine E2.

The transmission arrangements 10 shown in FIG. 1 to FIG. 8 allow the following operating modes:

| Op-erating mode | Energy source | | | Switching elements | | | | Operating mode shown |
|---|---|---|---|---|---|---|---|---|
| | ICE | E1 | E2 | SE | SEM | S1 | S2 | in Fig. |
| 1 OD | + | BL | +, − | OFF | X | R | 2, N | 1-8 |
| 2 eCVT1 | + | + | + | OFF | X | M | 1 | 1-4, 7, 8 |

-continued

| Op-erating mode | Energy source | | | Switching elements | | | | Operating mode shown |
|---|---|---|---|---|---|---|---|---|
| | ICE | E1 | E2 | SE | SEM | S1 | S2 | in Fig. |
| 3 eCVT2 | + | + | + | OFF | X | M | 2 | 1-8 |
| 4 EV1 | − | + | + | OFF | X | M | 1, 2 | 1-4, 7, 8 |
| 5 EV2 | BL | + | + | OFF | X | L | 1, 2 | 1-3, 7, 8 |
| 6 LH1V | + | + | − | ON | X | M | N | 1, 2, 7 |
| 7 LH2V | + | − | + | ON | X | M, (R) | 1, 2 | 3-6 |
| 8 LH3V | + | − | + | X | LHF | M | 2 | 8 |
| 9 LH3R | + | − | + | X | LHR | M | 1 | 8 |
| 10 CHM | + | + | + | OFF | N | M | (1), 2 | 1-8 |
| 11 CHS | + | + | − | OFF | N | M | (1), 2, (N) | 1-8 |

In the table, "+" means activated machine, "−" means deactivated machine and "BL" means blocked machine. "X" means switching element not available. The switching positions "OFF", "ON" of the emergency switching element SE; "LHF", "N", "LHR" of the emergency switching element SEM; "L", "M", "R" of the first switching element S1; and "1", "N", "2" of the second switching element S2 correspond to the switching positions of the switching elements SE, SEM, S1, S2 as indicated in FIG. 1 to FIG. 8. In switching position L of the first switching element S1, the internal combustion engine ICE is locked, in switching position R of the first switching element S1, the first electric machine S1 is locked. In the center position M, both the internal combustion engine ICE and the first electric machine E1 can provide drive torque. In position "N", the second electric machine E2 is disconnected. In switching positions 1 and 2, torque can be provided via different transmission stages G1, G2 by the second electric machine E2 into the drive train 19 of the transmission arrangement 10. In position "N", the second electric machine E2 is decoupled from the rest of the transmission.

Line 1 of the table shows the OD (Overdrive) mode, which can be used especially in the upper speed range to reduce fuel consumption, emissions and noise levels. Preferably, only the internal combustion engine ICE is in operation and can be operated at optimum speed. The second electric machine E2 can be mechanically disconnected (position "N" of the second switching element S2) and the first electric machine E1 can be blocked (position "R" of the first switching element S1). This prevents losses by the electric machines E1 and E2. If required, the second electric machine E2 can be connected as a parallel hybrid drive (positions "1" or "2" of the second switching element S2) to generate an additional drive torque.

Line 2 of the table shows the operating mode eCVT1, in which both the internal combustion engine and the first electric machine E1 and second electric machine E2 are in operation, with the second electric machine E2 being coupled via the first transmission stage G1. By selective control of the two electric machines E1, E2, an electrically assisted continuously variable transmission ratio (eCVT) can be achieved between the ICE internal combustion engine and the drive wheels 15. This operating mode eCVT1 enables a high drive torque with a high transmission ratio of the first transmission stage G1.

Line 3 shows, analogous to operating mode eCVT1, operating mode eCVT2, in which both the internal combustion engine and the first electric machine E1 and second electric machine E2 are in operation, with the second electric machine E2 being coupled via the second transmission stage G2. This operating mode eCVT2 allows high driving speeds with a low gear ratio of the second transmission stage G2.

Line 4 shows the purely electrical operating mode EV1, in which the internal combustion engine ICE is switched off but not blocked (the first switching element is in switching position "M"). Both the first electric machine E1 and the second electric machine E2 are activated. The second electric machine E2 delivers drive torque for the output, wherein the first electric machine E1 or, alternatively, the disengaged internal combustion engine ICE can run at a speed forced upon it. This operating mode is preferably only used for drive on level ground or on small inclines.

Line 5 shows the purely electrical operating mode EV2, in which the internal combustion engine ICE is blocked (the first switching element S1 is in switching position "L"). Both the first electric machine E1 and the second electric machine E2 are activated. Both electric machines E1 and E2 are used for the drive.

Line 6 shows the operating mode LH1V ("Limp Home"), in which the vehicle is driven only by the internal combustion engine ICE. The emergency switching element SE is in the "ON" position, whereby the transmission input shaft 12 is drive-connected to the first sun gear zs1 in addition to the connection to the planet carrier c1. The first switching element S1 is in the center position "M", the second switching element S2 in the neutral position "N". The first electric machine E1 and the second electric machine E2 can be deactivated.

Line 7 shows the operating mode LH2V ("Limp Home"), in which the vehicle is driven only by the internal combustion engine ICE. The emergency switching element SE is in the "ON" position, wherein the transmission input shaft 12 is connected to the second sun gear zs2 for drive. The first switching element S1 is in the middle position "M", the second switching element S2 in position "1" or "2". The first electric machine E1 can be deactivated and the second electric machine E2 can rotate with a speed forced upon it.

Line 8 shows the operating mode LH3V ("Limp Home Forward"), in which the vehicle is driven only by the internal combustion engine ICE. The emergency switching element SEM is in the "LHF" position, wherein the transmission input shaft 12 is drive-connected to the second sun gear zs2 in addition to the connection to the planet carrier c1. The first switching element S1 is in the center position "M", the second switching element S2 in position "2". The first electric machine E1 and the second electric machine E2 can be deactivated.

Line 9 shows the operating mode LH3R ("Limp Home Reverse"), in which the vehicle is driven only by the internal combustion engine ICE. The emergency switching element SEM is in the "LHR" position, which means that the transmission input shaft 12 is drive-connected to the second sun gear zs2 in addition to the connection to the planet carrier c1. The first switching element S1 is in the center position "M", the second switching element S2 in position "1". The first electric machine E1 and the second electric machine E2 can be deactivated.

Lines 10 and 11 show the CHM and CHS operating modes, for charging the vehicle battery, either while the vehicle is in motion (CHM operating mode) or while it is stationary (CHS operating mode). The internal combustion engine ICE and the first electric machine E1 are activated. In operating mode CHM, the second electric machine E2 is also activated and connected to the second sun gear zs2 either via the first transmission stage G1 or the second transmission stage G2. In operating mode CHS, the second electric machine E2 is deactivated and connected to the drive train 19 of the transmission arrangement 10 via either the first transmission stage G1 or the second transmission stage G2 (switching position "1" or "2" of the second switching element S2) or disconnected from it (switching position "N" of the second switching element S2).

The invention claimed is:

1. Transmission arrangement for a hybrid vehicle, comprising:
   a housing,
   a transmission input shaft,
   at least one transmission output shaft configured and arranged to drive drive wheels of the hybrid vehicle,
   a first planetary transmission set having
      a first sun gear,
      a first ring gear and
      a first planet carrier for a first planetary gear set configured and arranged to mesh with the first sun gear and the first ring gear,
   a second planetary transmission set having
      a second sun gear,
      a second ring gear and
      a second planet carrier for a second planetary gear set configured and arranged to mesh with the second sun gear and the second ring gear,
   wherein the transmission input shaft is connected in a rotationally fixed manner to the first planet carrier, and the first ring gear and second ring gear are permanently connected to each other and to the at least one transmission output shaft in a rotationally fixed manner,
   a first electric machine, and
   a second electric machine,
   wherein the first electric machine is permanently drive-connected to the first sun gear and the second electric machine is configured and arranged to be drive-connected to the second sun gear in at least one operating mode, and
   wherein the first sun gear configured and arranged to be connected to the housing via a first switching element, characterized in that the second planet carrier is fixedly connected to the housing and in that the second electric machine is fixedly connected to the second sun gear or the second electric machine is configured and arranged to be drive-connected to the second sun gear,
   characterized in that the at least one transmission output shaft is arranged coaxially with the transmission input shaft.

2. The transmission arrangement according to claim 1, characterized in that the second electric machine is configured and arranged to be drive-connected to the second sun gear via a second switching element.

3. The transmission arrangement according to claim 1, further including an emergency switching element, and the transmission arrangement is configured and arranged to operate in an emergency mode where the transmission input shaft is drive-connected via the emergency switching element either in addition to the connection to the first planet carrier selectively via a first forward transmission stage to the second sun gear or via a reverse transmission stage—which reverses the direction of rotation—to the second sun gear.

4. The transmission arrangement according to claim 1, characterized in that the transmission input shaft is configured and arranged to be drive-connected to the housing.

5. The transmission arrangement (10) according to claim 1, characterized in that the first electric machine and the second electric machine are arranged axially offset relative to one another.

6. The transmission arrangement according to claim 1, characterized in that the transmission input shaft is fixedly connected to a power take-off shaft or the transmission input shaft is configured and arranged to be drive-connected to a power take-off shaft.

7. The transmission arrangement according to claim 1, further including a power take-off shaft configured and arranged to be drive-connected to the transmission input shaft or to the second electric machine via a third switching element.

8. The transmission arrangement according to claim 1, characterized in that both the first and the second planetary gear sets are minus transmissions.

9. Method for operating a hybrid vehicle having a transmission arrangement according to claim 1, characterized in that in an overdrive mode of the hybrid vehicle the first electric machine is blocked, and wherein the first sun gear is connected to the housing via the first switching element.

10. The method according to claim 9, characterized in that in the overdrive mode the second electric machine is disconnected from the drive train via the second switching element.

11. The method according to claim 9, characterized in that in at least one emergency mode the transmission input shaft is drive-connected to the first sun gear or the second sun gear.

12. The method according to claim 9, characterized in that in an emergency mode the transmission input shaft is drive-connected to the second sun gear via an emergency switching element either in addition to the connection to the first planet carrier selectively via a first forward transmission stage to the second sun gear or via a reverse transmission stage—which reverses the direction of rotation—to the second sun gear.

13. The transmission arrangement according to claim 1, wherein the second electric machine is further fixedly connected or configured and arranged to be drive-connected to the second sun gear via at least one transmission stage.

14. The transmission arrangement according to claim 2, wherein the second electric machine is further configured and arranged to be drive-connected to the second sun gear via a second switching element and a first transmission stage or second transmission stage.

15. The transmission arrangement according to claim 5, wherein the first electric machine and the second electric machine are also arranged axially offset relative to the transmission input shaft or transmission output shaft.

16. The transmission arrangement according to claim 6, wherein the transmission input shaft is further fixedly connected or configured and arranged to be drive-connected to the power take-off shaft via a transmission stage.

17. The transmission arrangement according to claim 7, wherein the power take-off shaft is further fixedly connected or configured and arranged to be drive-connected to the transmission input shaft via a transmission stage or the second electric machine via a transmission stage.

18. Transmission arrangement for a hybrid vehicle, comprising:
a housing,
a transmission input shaft,
at least one transmission output shaft configured and arranged to drive drive wheels of the hybrid vehicle,
a first planetary transmission set having
a first sun gear,
a first ring gear and
a first planet carrier for a first planetary gear set configured and arranged to mesh with the first sun gear and the first ring gear,
a second planetary transmission set having
a second sun gear,
a second ring gear and
a second planet carrier for a second planetary gear set configured and arranged to mesh with the second sun gear and the second ring gear,
wherein the transmission input shaft is connected in a rotationally fixed manner to the first planet carrier, and the first ring gear and second ring gear are permanently connected to each other and to the at least one transmission output shaft in a rotationally fixed manner,
a first electric machine, and
a second electric machine,
wherein the first electric machine is permanently drive-connected to the first sun gear and the second electric machine is configured and arranged to be drive-connected to the second sun gear in at least one operating mode, and
wherein the first sun gear configured and arranged to be connected to the housing via a first switching element, characterized in that the second planet carrier is fixedly connected to the housing and in that the second electric machine is fixedly connected to the second sun gear or the second electric machine is configured and arranged to be drive-connected to the second sun gear,
an emergency switching element, and the transmission arrangement is configured and arranged to operate in an emergency mode where the transmission input shaft is drive-connected to the first sun gear or the second sun gear via the emergency switching element.

19. Transmission arrangement for a hybrid vehicle, comprising:
a housing,
a transmission input shaft,
at least one transmission output shaft configured and arranged to drive drive wheels of the hybrid vehicle,
a first planetary transmission set having
a first sun gear,
a first ring gear and
a first planet carrier for a first planetary gear set configured and arranged to mesh with the first sun gear and the first ring gear,
a second planetary transmission set having
a second sun gear,
a second ring gear and
a second planet carrier for a second planetary gear set configured and arranged to mesh with the second sun gear and the second ring gear,
wherein the transmission input shaft is connected in a rotationally fixed manner to the first planet carrier, and the first ring gear and second ring gear are permanently connected to each other and to the at least one transmission output shaft in a rotationally fixed manner,
a first electric machine, and
a second electric machine,
wherein the first electric machine is permanently drive-connected to the first sun gear and the second electric machine is configured and arranged to be drive-connected to the second sun gear in at least one operating mode, and
wherein the first sun gear configured and arranged to be connected to the housing via a first switching element, characterized in that the second planet carrier is fixedly connected to the housing and in that the second electric machine is fixedly connected to the second sun gear or the second electric machine is configured and arranged to be drive-connected to the second sun gear, characterized in that the transmission input shaft is configured and arranged to be drive-connected to the housing, and wherein the transmission input shaft is connected to the housing via the first switching element.

\* \* \* \* \*